(12) United States Patent
Seide et al.

(10) Patent No.: US 7,401,019 B2
(45) Date of Patent: Jul. 15, 2008

(54) PHONETIC FRAGMENT SEARCH IN SPEECH DATA

(75) Inventors: Frank T. Seide, Beijing (CN); Eric I-Chao Chang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 795 days.

(21) Appl. No.: 10/757,885

(22) Filed: Jan. 15, 2004

(65) Prior Publication Data

US 2005/0159953 A1    Jul. 21, 2005

(51) Int. Cl.
*G10L 15/04* (2006.01)
*G10L 15/00* (2006.01)
*G10L 15/28* (2006.01)

(52) U.S. Cl. .................. 704/254; 704/235; 704/255

(58) Field of Classification Search .................. None
See application file for complete search history.

(56) References Cited

U.S. PATENT DOCUMENTS

| | | | | |
|---|---|---|---|---|
| 6,073,095 | A * | 6/2000 | Dharanipragada et al. | 704/242 |
| 6,377,927 | B1 * | 4/2002 | Loghmani et al. | 704/275 |
| 6,697,796 | B2 * | 2/2004 | Kermani | 707/3 |
| 6,990,448 | B2 * | 1/2006 | Charlesworth et al. | 704/243 |
| 7,212,968 | B1 * | 5/2007 | Garner et al. | 704/251 |
| 2003/0009331 | A1 * | 1/2003 | Schalkwyk et al. | 704/237 |

OTHER PUBLICATIONS

James et al, "A Fast Lattice-Based Approach to Vocabulary Independent Wordspotting", Proc. ICASSP, Adelaide, 1994.*
J. Garofolo, "TREC-9 Spoken Document Retrieval Track" National Institute of Standards and Technology, http://trec.nist.gov/pubs/trec9.
Logan et al., "An experimental study of an audio indexing system for the web", Proc. ICSLP '2000, Beijing, China 2000.
Logan et al., "Word and subword indexing approaches for reducing the effects of OOV queries on spoken audio", Proc HLT '2002.
P. Schauble et al., "First experience with a system for content based retrieval of information from speech recordings." Proc. IJCAI '95.
Ng, "Subword-based approaches for spoken document retrieval" Ph.D. thesis, Massachusetts institute of Technology, 2000.
James et al., "A fast lattice-based approach to vocabulary-independent wordspotting", Proc. ICASSP '04, Adelaide, 1994.
Clements et al., "Phonetic Searching vx. LVCSR: How to find what you really want in audio archives", AVIOS 2001.
Evermann et al., "Large Vocabulary Decoding and Confidence Estimate Using Word Posterior Probabilities", Proc. ICASSP '2000, pp. 2366-2369, Istanbul, 2000.

(Continued)

*Primary Examiner*—David R. Hudspeth
*Assistant Examiner*—Samuel G Neway
(74) *Attorney, Agent, or Firm*—Joseph R. Kelly; Westman, Champlin & Kelly, P.A.

(57) ABSTRACT

A method of searching audio data is provided including receiving a query defining multiple phonetic possibilities. The method also includes comparing the query with a lattice of phonetic hypotheses associated with the audio data to identify if at least one of the multiple phonetic possibilities is approximated by at least one phonetic hypothesis in the lattice of phonetic hypotheses.

4 Claims, 3 Drawing Sheets

OTHER PUBLICATIONS

Schwartz et al., "A comparison of several approximate algorithms for finding multiple (n-best) sentence hypotheses", Proc. ICSLP '94, Yokohama 1994.

Ortmanns et al., "A comparison of the time conditioned and word conditioned search techniques for large-vocabulary speech recognition", Proc. ICSLP '96, vol. 2, pp. 1017-1020, Philadelphia, 1996.

D. Klakow, "Language-model optimization by mapping of corpora", Proc. ICASSP '98.

Gales et al., "Porting: Switchboard to the Voicemail task", Proc. ICASSP '03, Hongkong, 2003.

Logan et al., "Fusion of Semantic and Acoustic Approaches for Spoken Document Retrieval", Proc. ISCA Workshop on Multilingual Spoken Document Retrieval, April 4-5, 2003, Hong Kong, Copyright Hewlett-Packard Company 2003.

Fast-Talk Communications, "The Power to Search Audio", http://www.fast-talk.com.

* cited by examiner

PHONETIC FRAGMENT SEARCH IN SPEECH DATA

BACKGROUND OF THE INVENTION

The present invention relates to searching audio data. In particular, the present invention relates to matching an input search query within audio data.

The increasing storage capacity and processing capabilities of computers has led to the further development of applications that utilize and store audio data. These applications store audio and video data of voicemails, lectures, meetings, interviews and broadcasts. With a large amount of audio data, methods have been devised to search and retrieve keywords within the audio data.

In some instances, a speech recognizer processes audio data to identify words therein. Search queries can then be matched to recognized words in the audio data. This approach, however, requires a large vocabulary and is not adept to recognizing specialized keywords, such as person and place names. Other approaches utilize phonemes to match search queries. In some phoneme-based approaches, language knowledge utilized by respective systems is limited and the amount of data needed to run the systems is large. As a result, a system that utilizes language knowledge of adequate size is needed for searching of audio data.

SUMMARY OF THE INVENTION

A method of searching audio data is provided including receiving a query defining multiple phonetic possibilities. The method also includes comparing the query with a lattice of phonetic hypotheses associated with the audio data to identify if at least one of the multiple phonetic possibilities is approximated by at least one phonetic hypothesis in the lattice of phonetic hypotheses.

Yet another aspect of the present invention is a method of generating a lattice from audio data. The method includes recognizing phonetic fragments within the audio data, wherein at least some of the phonetic fragments include at least two phones. Furthermore, a score is calculated for paths joining adjacent phonetic fragments.

Another aspect of the present invention includes a computer readable-medium encoded with a data structure. The data structure includes a plurality of phonetic fragments, wherein at least some of the fragments include at least two phones. A plurality of paths connecting the phonetic fragments is also provided. Each path has an associated score.

DETAILED DESCRIPTION OF THE PREFERRED EMBODIMENTS

Figure 1:
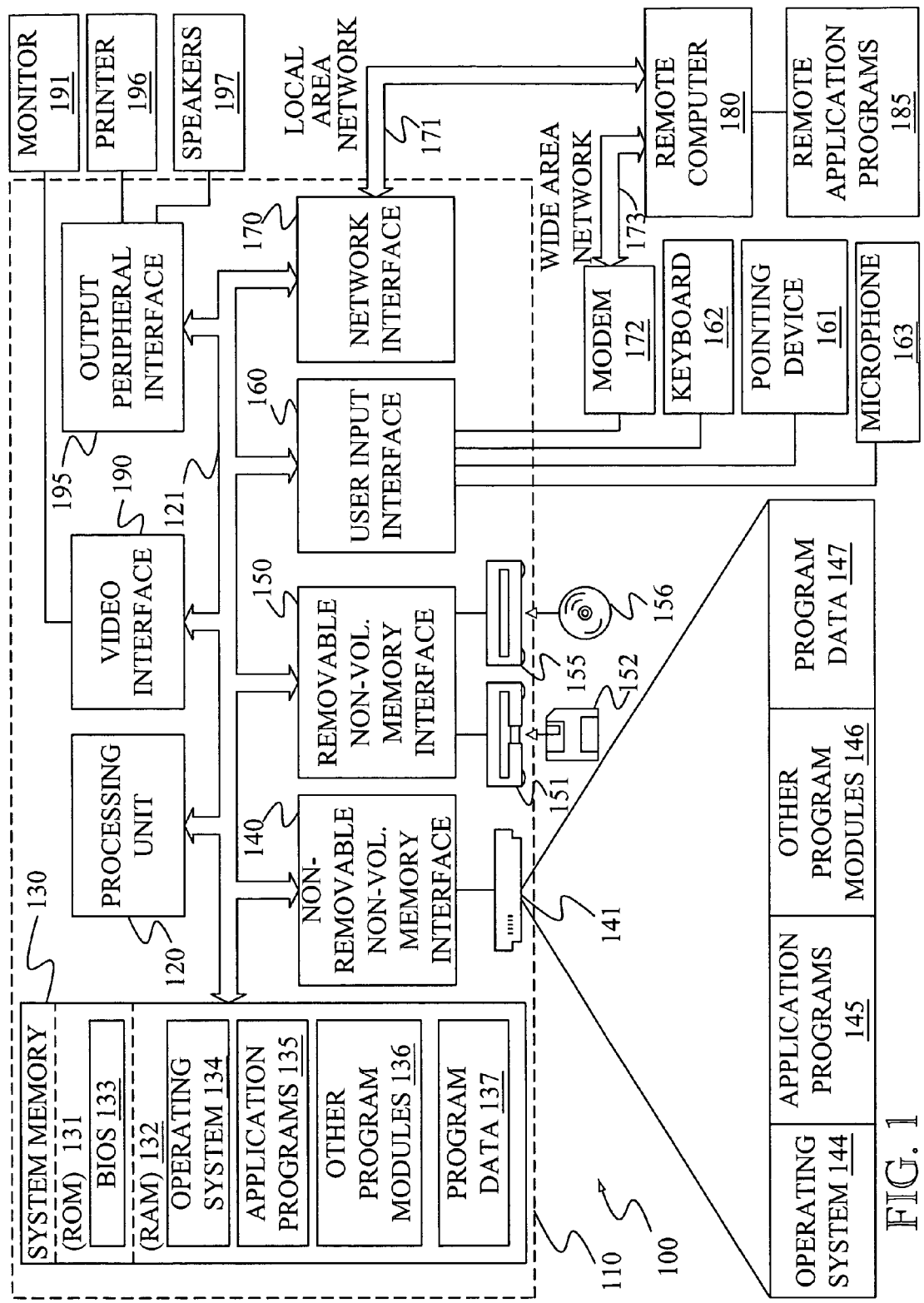
FIG. 1 is a block diagram of a general computing environment in which the present invention can be useful.

Prior to discussing the present invention in greater detail, one embodiment of an illustrative environment which the present invention can be used will be discussed. FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. Tasks performed by the programs and modules are described below and with the aid of figures. Those skilled in the art can implement the description and figures as processor executable instructions, which can be written on any form of a computer readable medium.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available medium or media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
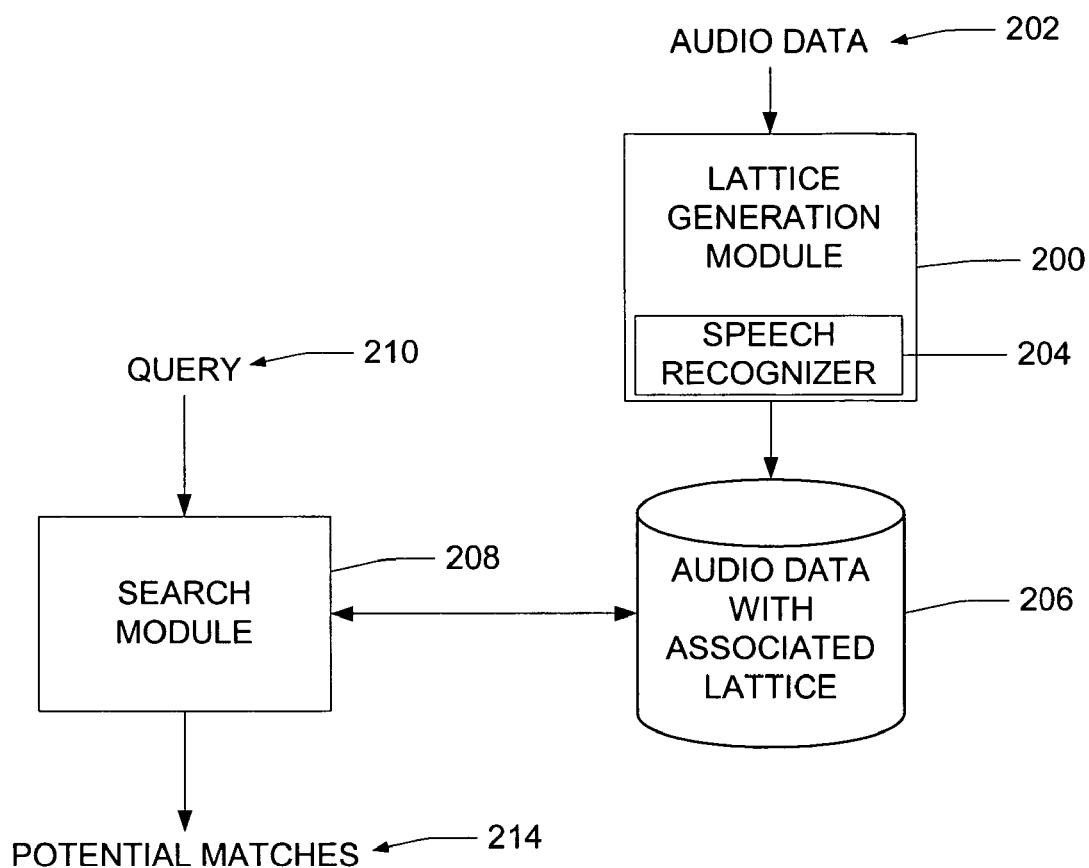
FIG. 2 is a flow diagram of recognizing audio data and searching based on a query.

FIG. 2 illustrates a flow diagram in accordance with an embodiment of the present invention. A lattice generation module 200 receives audio data 202 as input. Audio data 202 can be any type of audio data including recordings of speech, speech data, voicemails, lectures, broadcasts, etc. The lattice generation module 200 also includes a speech recognizer 204 to identify phonemes and phonetic fragments according to a dictionary. Using the output from speech recognizer 204, lattice generation module 200 constructs a lattice of phonetic hypotheses, wherein each hypothesis includes an associated time boundary and accuracy score. After the lattice is generated for audio data 202, it is stored in a suitable database 206.

Various lattice pruning techniques can be used in order to conserve memory and provide a more efficient search. These techniques include beam pruning, forward-backward pruning and others. In one exemplary technique, a hypothesis is compared to a best hypothesis. If the hypothesis does not have a score close enough to the best hypothesis, the hypothesis can be pruned.

Other approaches to alter the lattice for more accurate and efficient searching can be used. For example, the lattice can be altered to allow crossover between phonetic fragments. Additionally, penalized back-off paths can be added to allow transitions between hypotheses with mismatching paths in the lattice. Thus, output scores can include inconsistent hypotheses. In order to reduce the size of the lattice, hypotheses can be merged to increase the connectivity of phonemes and thus reduce the amount of audio data stored in the lattice. Furthermore, audio frames can be collapsed into single frames. For example, three frames can be collapsed into a single frame to reduce the amount of data stored in the lattice.

Speech recognizer 204 operates based upon a dictionary of phonetic word fragments. In one embodiment, the fragments are determined based on a calculation of mutual-information of adjacent units v and w, (which may be phonemes or combinations of phonemes). Mutual information MI can be defined as follows:

$$MI(v, \omega) = \log\left(\frac{P(v, \omega)}{P(v) \cdot P(\omega)}\right) \cdot P(v, \omega)$$

Any pairs (v, w) having a MI above a particular threshold can be used as candidates for fragments to be chosen for the dictionary. A pair of units can be eliminated from a candidate list if one or both of the constituent units are part of a pair with a higher MI value. Pairs that span word boundaries are also eliminated from the list. Remaining candidate pairs v w are replaced in a training corpus by single units v-w. The process for determining candidate pairs can be repeated until a desired number of fragments is obtained. Examples of fragments generated by the mutual information process described above are /-k-ih-ng/ (the syllable -king), /ih-n-t-ax-r/ (the syllable inter-), /ih-z/ (the word is) and /ae-k-ch-uw-ax-l-iy/ (the word actually).

A search module 208 accesses database 206 in order to determine if a query 210 includes a match in the audio data. Query 210 can be a phonetic sequence or a grammar of alternative sequences. During matching, lattice paths that match or closely correspond to the query 210 are identified and a probability is calculated based on the recognition scores in the associated lattice. The hypotheses identified are then output by search module 208 as potential matches 214.

As mentioned, query 210 can be a grammar corresponding to pronunciation alternatives that define multiple phonetic possibilities. In one embodiment, the grammar query can be represented as a weighted finite-state network. The grammar may also be represented by a context-free grammar, a unified language model, N-gram model and/or a prefix tree, for example.

In each of these situations, nodes can represent possible transitions between phonetic word fragments and paths between nodes can represent the phonetic word fragments. Alternatively, • nodes can represent the phonetic word fragments themselves. In the case where query 210 is a grammar, alternative pronunciations can be searched within database 206 simultaneously. Additionally, complex expressions such as telephone numbers and dates can be searched based on an input grammar defining these expressions. For example, a grammar may define two possibilities for the pronunciation of the word "either", namely one beginning with the syllable "i" and one beginning with the syllable "e", both followed by the syllable "ther". Other alternatives can also be searched using a grammar as the input query, for example a self-introduction on a voice mail, where alternatives are in parentheses, "(this is | it's) Bill (speaking | calling)".

It is also worth noting that a hybrid approach to searching within database 206 can also be used. In a hybrid approach, phonetic fragment search can be used for queries that have a large number of phones, for example seven or greater phones. For short phones, a word-based search can be used.

Figure 3:
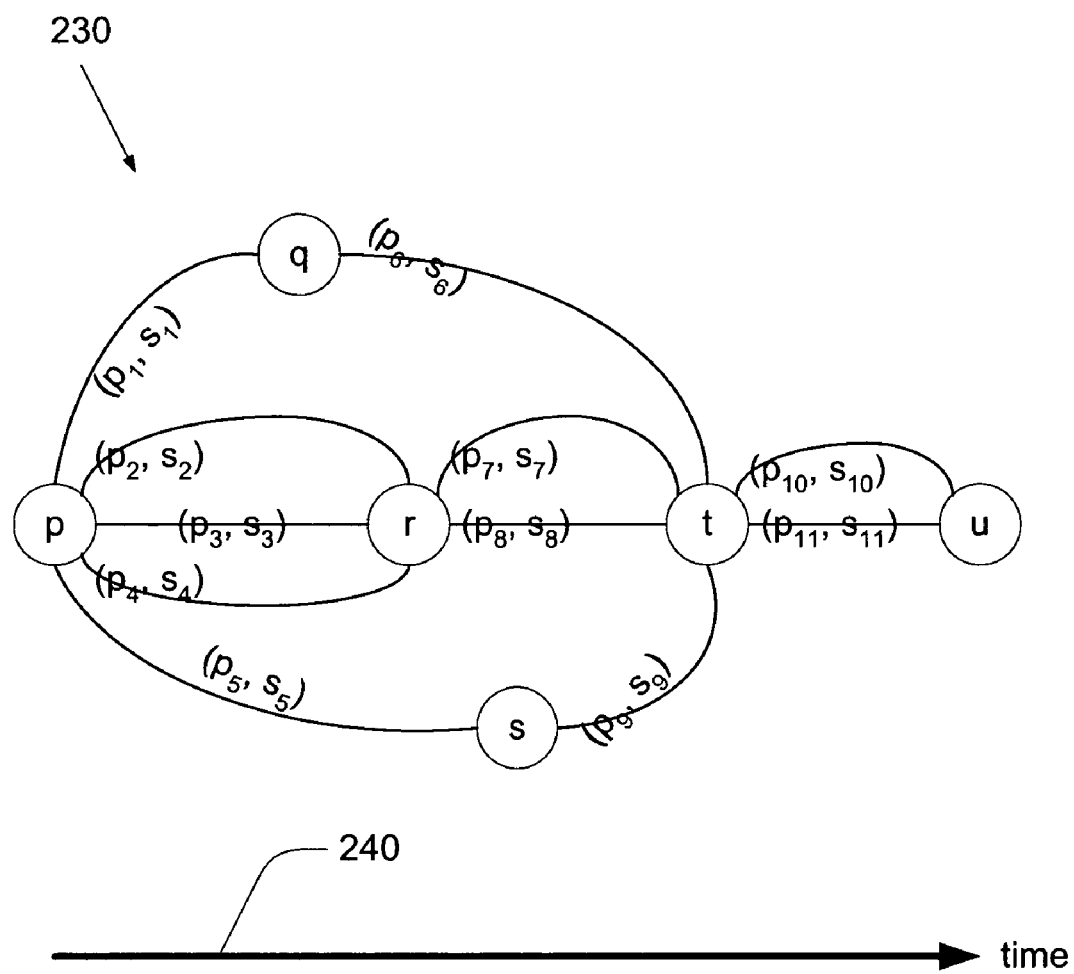
FIG. 3 is a representation of a lattice.

FIG. 3 illustrates an exemplary lattice 230 with nodes p-u and paths between the nodes. Each node has an associated time value or span relative to a timeline 240. Each path from one node to an adjacent node represents a phonetic word fragment (denoted by $p_n$) and includes an associated score (denoted by $s_n$) representing the likelihood of the path's hypothesis given the corresponding audio segment. A collection of phoneme hypotheses form the phonetic word fragments and paths from a phoneme hypothesis in one fragment to a phoneme hypothesis in another fragment are provided in lattice 320 and form a transition from one fragment to another fragment.

For example, the score of the path from node p to node q is represented as $s_1$. If a query matches node r, paths associated with scores $S_7$ and $S_8$ will be explored to node t to see if any paths match. Then, paths associated with scores $s_{10}$ and $s_{11}$ will be explored to node u. If the paths reach the end of the query, a match is determined. The associated scores along the paths are then added to calculate a hypothesis score. To speed the search process, paths need not be explored if matches share identical or near identical time boundaries.

The result of the search operation is a list of hypotheses (W, $t_s$, $t_e$, P(W $t_s$ $t_e$ |O)) that match the query string W in a time range from $t_s$ to $t_e$. A probability P(W $t_s$ $t_e$ |O), known as the "posterior probability" is a measure of the closeness of the match. W is represented by a phoneme sequence and O denotes the acoustic observation expressed as a sequence of feature vectors ot. Summing the probabilities of all paths that contain the query string W from $t_s$ to $t_e$ yields the following equation:

$$P(Wt_st_e | O) = \frac{\sum_{W_-,W_+} p(Ot_st_e | W_-WW_+)P(W_-WW_+)}{\sum_{W'} p(O | W')P(W')}$$

Here, $W_-$ and $W_+$ denote any word sequences before $t_s$ and after $t_e$, respectively and W' is any word sequence. Furthermore, the value p($Ot_st_e$|$W_-WW_+$) is represented as:

$$p(Ot_st_e|W_-WW_+) = p(o_{0...t_s}|W_-)p(o_{t_s...t_e}|W)p(o_{t_e...T}|W_+)$$

By using the above-described lattice and search methods, audio data can efficiently be processed and searched to match phonetic fragments based on a query. The query can include phones or a grammar representing multiple possibilities. A lattice can be generated for the audio data based on acoustic observations in the audio data and hypotheses including phonetic fragments and paths between fragments can be developed. As a result, searching through audio data can become quicker and more accurate.

Although the present invention has been described with reference to preferred embodiments, workers skilled in the art will recognize that changes may be made in form and detail without departing from the spirit and scope of the invention.

What is claimed is:

1. A method of generating a lattice from audio data, comprising:
   recognizing phonetic fragments within the audio data wherein at least some of the phonetic fragments include at least two phones;
   accessing a mutual information score for recognized phonetic fragments within the audio data that include at least two phones, wherein the mutual information score for each of the phonetic fragments having at least two phones is a function of a likelihood that phones in the phonetic fragment occur consecutively and a likelihood that each phone in the phonetic fragment occurs independent of other phones in the phonetic fragment; and
   determining a score for paths joining adjacent phonetic fragments in the audio data using in part the mutual information score for the phonetic fragments having at least two phones.

2. The method of claim 1 and further comprising:
   calculating time values and individual acoustic scores for each phone of each of the phonetic fragments.

3. The method of claim 1 and further comprising:
   pruning paths that have a score that does not meet a threshold level.

4. The method of claim 1 and further comprising:
   collapsing a plurality of audio frames in the audio data into a single audio frame.

* * * * *